(12) United States Patent
Fanson et al.

(10) Patent No.: US 7,664,144 B2
(45) Date of Patent: Feb. 16, 2010

(54) PACKET-SWITCHED NETWORK SYNCHRONIZATION SYSTEM AND METHOD

(75) Inventors: John Fanson, Ottawa (CA); Yu Wang, Kanata (CA)

(73) Assignee: Edgewater Computer Systems, Inc. (CA)

( * ) Notice: Subject to any disclaimer, the term of this patent is extended or adjusted under 35 U.S.C. 154(b) by 378 days.

(21) Appl. No.: 11/614,875

(22) Filed: Dec. 21, 2006

(65) Prior Publication Data

US 2008/0151940 A1 Jun. 26, 2008

(51) Int. Cl.
*H04J 3/06* (2006.01)
(52) U.S. Cl. ........................ 370/503; 370/507
(58) Field of Classification Search ........... 370/503, 370/507
See application file for complete search history.

(56) References Cited

U.S. PATENT DOCUMENTS

| | | | |
|---|---|---|---|
| 6,188,718 B1 | 2/2001 | Gitlin et al. | 375/148 |
| 6,823,100 B1 | 11/2004 | Roemerman | 385/18 |
| 7,092,452 B2 | 8/2006 | Taylor et al. | 375/267 |
| 7,254,158 B2 | 8/2007 | Agrawal | 375/136 |
| 7,483,450 B1 * | 1/2009 | Giese et al. | 370/507 |
| 2003/0018840 A1 | 1/2003 | Chandler et al. | 710/100 |
| 2003/0189999 A1 | 10/2003 | Kadous | 375/349 |
| 2003/0223354 A1 | 12/2003 | Olszewski | 370/208 |
| 2004/0013131 A1 | 1/2004 | Owens et al. | 370/466 |
| 2004/0205285 A1 | 10/2004 | Kinstler | 710/315 |
| 2006/0101184 A1 | 5/2006 | Hegarty | 710/307 |
| 2007/0291881 A1 | 12/2007 | Glass | 375/346 |

OTHER PUBLICATIONS

Graber, Bryan, The Use of Discrete Multi-Tone (DMT) Signaling for Data Transmissions on Esistin AS15531 Networks:, White Paper on DMT Technology, Aug. 15,1998.
Adams, Charlotte, "Product Focus: 1553, Still a Key Standard", Aviation Today, Dec. 1, 2000. www.aviationtoday.com/cgi/av/show_mag.cgi?pub=av&mon=1200&file=1200productfocus.htm.
Keller, John, "Rebirth of the 1553 databus", Miltary & Aerospace Electronics, Feb. 2006. http://mae.pennnet.com/Articles_Display.cfm?Section=ARTCL&ARTICLE_ID=248183&VERSION_NUM=2&p=32.
Official Actions received in related U.S. Appl. Nos. 11/463,860 and 11/419,742.

* cited by examiner

*Primary Examiner*—Melvin Marcelo
(74) *Attorney, Agent, or Firm*—Hayes Soloway P.C.

(57) ABSTRACT

A synchronization system and method for use in a packet switched communication network are provided. The synchronization system comprises a transmitter-identification system, a packet-boundary detection system and a storage-access system. The transmitter-identification system enables each receiving terminal within the network to know the identity of the originating transmitter terminal for a given packet of information, prior to the reception of this packet of information. The packet-boundary detection system enables detection of packet synchronization parameters for all transmitter-receiver pairs of terminals within the network. The storage-access system stores the detected packet synchronization parameters and allows the receiver to access the packet synchronization parameters. According to one embodiment of the invention, the synchronization method comprises the step of detecting synchronization parameters and, for a given receiver terminal, establishing the identity of the originating transmitter for an incoming packet of information, accessing synchronization parameters corresponding to the identified transmitter, adjusting receiver based on accessed synchronization parameters and decoding the incoming packet of information.

22 Claims, 8 Drawing Sheets

PACKET-SWITCHED NETWORK SYNCHRONIZATION SYSTEM AND METHOD

STATEMENT REGARDING FEDERALLY SPONSORED RESEARCH OR DEVELOPMENT

This invention was made with Government support under Contract FA8626-06-D-2083 awarded by the United States Air Force. The government has certain rights in the invention.

BACKGROUND OF THE INVENTION

Communications systems can be divided into two types, packet switched or circuit switched. A circuit switched network provides for a dedicated physical path or channel established between two end points or terminals on the network for the duration of the connection. The channel can be dedicated wiring or a portion of the spectrum in wireless communications. Even if no actual communication is taking place over a dedicated circuit, that circuitry still remains unavailable to other users. In contrast, packet switched networks allow the same data path to be shared among many users in the network, by breaking communication down into relatively small units of data called packets, which are routed through a network based on a destination address contained within each packet. This results in increased bandwidth availability.

A packet, also known in the art as a frame of information, generally comprises a preamble part and a data part. The preamble may have a number of synchronization symbols, used for achieving synchronization. The words packet and frame will be interchangeably used throughout this document.

In serial data transmission, synchronization processes ensure that a receiving end recognizes symbols in the order in which the transmitting end has sent them, and can determine where one symbol ends and the next begins. Synchronization processes include clock synchronization, symbol synchronization when the symbol rate is different than the clock rate, frame synchronization when a frame contains several symbols, and all rely on clocking mechanisms to synchronize the signals between the sending and receiving machines. Synchronization can also refer to other aspects of a data signal in connection with the ability of a terminal to interpret this data signal, such as frequency, amplitude, phase, etc.

Typically, for a circuit switched network, clock synchronization and symbol synchronization are generally determined at the configuration of the circuit and maintained for the duration of the connection. However, in general, for packet switched networks there are no dedicated paths, and packets may arrive at a receiving end from any other terminal at any given reference point, with respect to an internal reference system of the receiving end. Specifically, interpretation of a received packet with respect to an internal timing reference system of the receiving end is currently a complex aspect to tackle. The arrival time of packets is generally not known at the receiving end prior to the arrival of the packet, especially at a timing resolution less than the duration of a symbol used for signaling. Therefore, clock and symbol synchronization for packet switched networks are generally more complex and/or less accurate than in the circuit switched networks. Multiple access systems such as Time Division Multiple Access (TDMA) where the network is generally shared and there is typically an unknown time delay between terminals, or wireless networks with channel fading conditions or communications over power line channels where a light has been switched on, present especially difficult challenges in achieving synchronization.

Since packets generally arrive at the receiving end at unknown times with respect to an internal reference timing system, traditionally, in packet switched network, frame synchronization is performed for every incoming frame of information at a receiver terminal. A correlation receiver may be used, for example, to detect sync symbols within the preamble of incoming packets, in order to detect packets. Decoding of the actual data, within packets, would follow the detection of the preamble. This approach presents several drawbacks: firstly, preamble detection and alignment of sync symbols with an internal clock involves complex computations, therefore requiring such computations for every incoming packet results in more complex hardware requirements. Secondly, the sync symbols detection and the decoding of the data part are carried within a single frame, for each frame, which can lead to either accuracy issues for frames with a preamble of a shorter duration, or to timing and bandwidth constraints when a longer duration preamble is used.

MIL-STD-1553 or simply 1553, is an approximately 30 year old technology that defines the electrical and signaling characteristics for 1 Mbps communications over an asynchronous serial, command/response digital data bus on which messages are time division multiplexed among users. The transmission medium is a twisted wire cable pair. 1553 specifies all of the electrical characteristics of the receivers, transmitters, and cable used to implement the bus, as well as the complete message transmission protocol. 1553 is designed for high integrity message exchanges between unattended equipment. According to the preferred embodiment disclosed in the co-assigned U.S. patent application Ser. No. 11/419, 742, which is incorporated here by reference, Orthogonal Frequency Division Multiplexing (OFDM), closely related to Discrete Multi-Tone (DMT), is used to better utilize the available bandwidth on the bus, creating an "overlay" packet-switched network to operate concurrently and without disturbing existing 1553 communications.

SUMMARY OF THE INVENTION

An object of the invention is to provide a synchronization system and method for use in a packet switched communication network.

The synchronization system comprises a transmitter-identification system, a packet-boundary detection system and a storage-access system. The transmitter-identification system enables each receiving terminal within the network to know the identity of the originating transmitter terminal for a given packet of information, prior to the reception of this packet of information. The packet-boundary detection system enables detection of packet synchronization parameters for all transmitter-receiver pairs of terminals within the network. The storage-access system stores the detected packet synchronization parameters and allows the receiver within the corresponding transmitter-receiver pair to access the packet synchronization parameters.

Furthermore, a method of packet synchronization within a packet-switched communication network comprising a plurality of terminals is provided.

According to one embodiment of the invention, the method comprises the step of detecting synchronization parameters and, for a given receiver terminal, establishing the identity of the originating transmitter for an incoming packet of information, accessing synchronization parameters corresponding to the identified transmitter, adjusting receiver based on accessed synchronization parameters and decoding the incoming packet of information.

According to an alternate embodiment, at a given receiver terminal within the network, the method of packet synchronization comprises the first step of establishing the identity of the originating transmitter for an incoming packet of information. Subsequently, if synchronization parameters corresponding to the identified transmitter are available, they are accessed and the receiver is adjusted based on thus enabling decoding of the incoming packet of information. If synchronization parameters corresponding to the identified transmitter are not available, they are detected, calculated or estimated and stored.

Embodiments of the system and method according to invention present advantages in terms of complexity, robustness and accuracy compared to prior-art methods.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
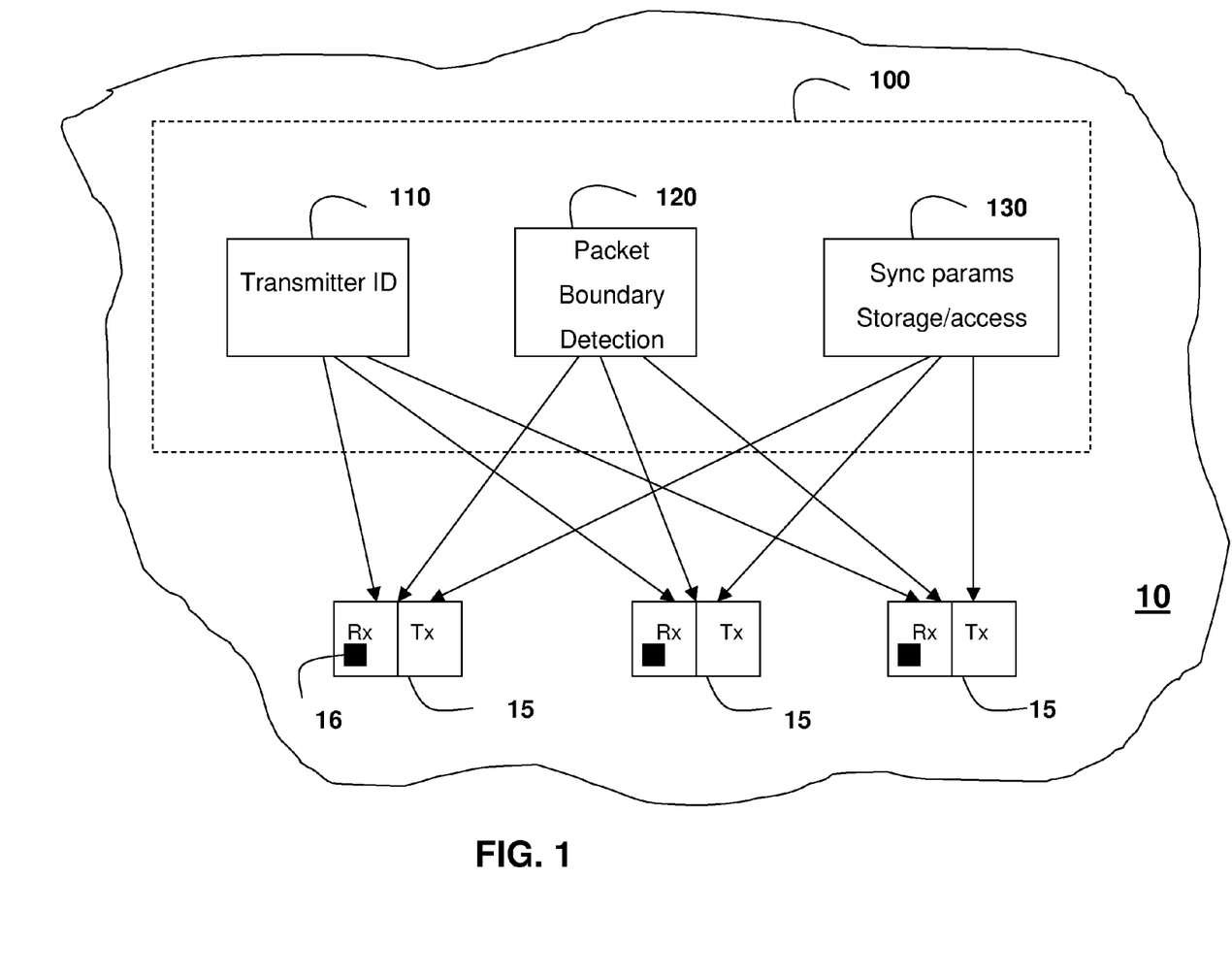
FIG. 1 is a block diagram of a packet switched network comprising a synchronization system according to an embodiment of the invention.

FIG. 1 illustrates a packet switched network 10 comprising a synchronization system 100 according to an embodiment of the invention. The network 10 can be any packet switched networks known in the art. Advantageously, synchronization system 100 would be used within a packet switched network 10 where the topology does not change significantly, from a signal timing point of view, over a relatively long period of time, substantially greater than the duration of a typical transmitted waveform. Most packet-based networks over fixed length connections, either wireless or wired, fit this requirement.

The synchronization system 100 has a transmitter identification system 110, a packet boundary detection system 120 for detecting synchronization parameters and a storage-access system 130 for storing/accessing synchronization parameters. The transmitter identification system 110, packet boundary detection system 120 and storage-access system 130 are all connected to terminals 15 within the packet switched network, via either wireless or wired communication media or a combination of these.

For every received packet of information at a given receiving terminal 15, the transmitter identification system 110 communicates to the receiving terminal 15 the identity of the originating transmitter terminal 15. The communication of the identity of originating transmitter occurs prior to the reception of the given packet of information at the receiver, sufficiently in advance to allow retrieval of associated synchronization parameters by the receiver and receiver adjustment based on these parameters, for the purpose of decoding the packet. In practice, the transmitter identification system 110 can be implemented by various means known to someone skilled in the art, including, without limitation, command/response media access protocols, a transmission schedule shared by all terminals on a bus, or priority signaling scheme where each terminal asserts priority during a priority signaling interval and each terminal unambiguously determines the outcome of the priority signaling to know which terminal is to transmit next, etc.

The packet boundary detection system 120 enables detection of packet synchronization parameters for transmitter-receiver pairs of terminals 15 within the network 10. Synchronization parameters may include any parameters useful in synchronizing received frames with a internal reference system of the receiver 16, such as time alignment parameters indicating boundaries of a frame structure relative to the reference timing system of a given receiver, frequency parameters indicating frequency offsets relative to a reference frequency system, gain control parameters, etc. The packet boundary system 120 may detect packet synchronization parameters by any means known in the art, such as by use of a correlation receiver that correlates incoming waveforms with a known transmitted waveform.

The storage-access system 130 allows for storage of synchronization parameters for transmitter-receiver terminal pairs as detected via the packet boundary detection system 120, as well as for access of the synchronization parameters by the transmitter-receiver terminal pairs as required for decoding incoming packets at a receiving terminal. Any network topology change affecting some or all synchronization parameters requires an update of associated synchronization parameters.

Figure 2:
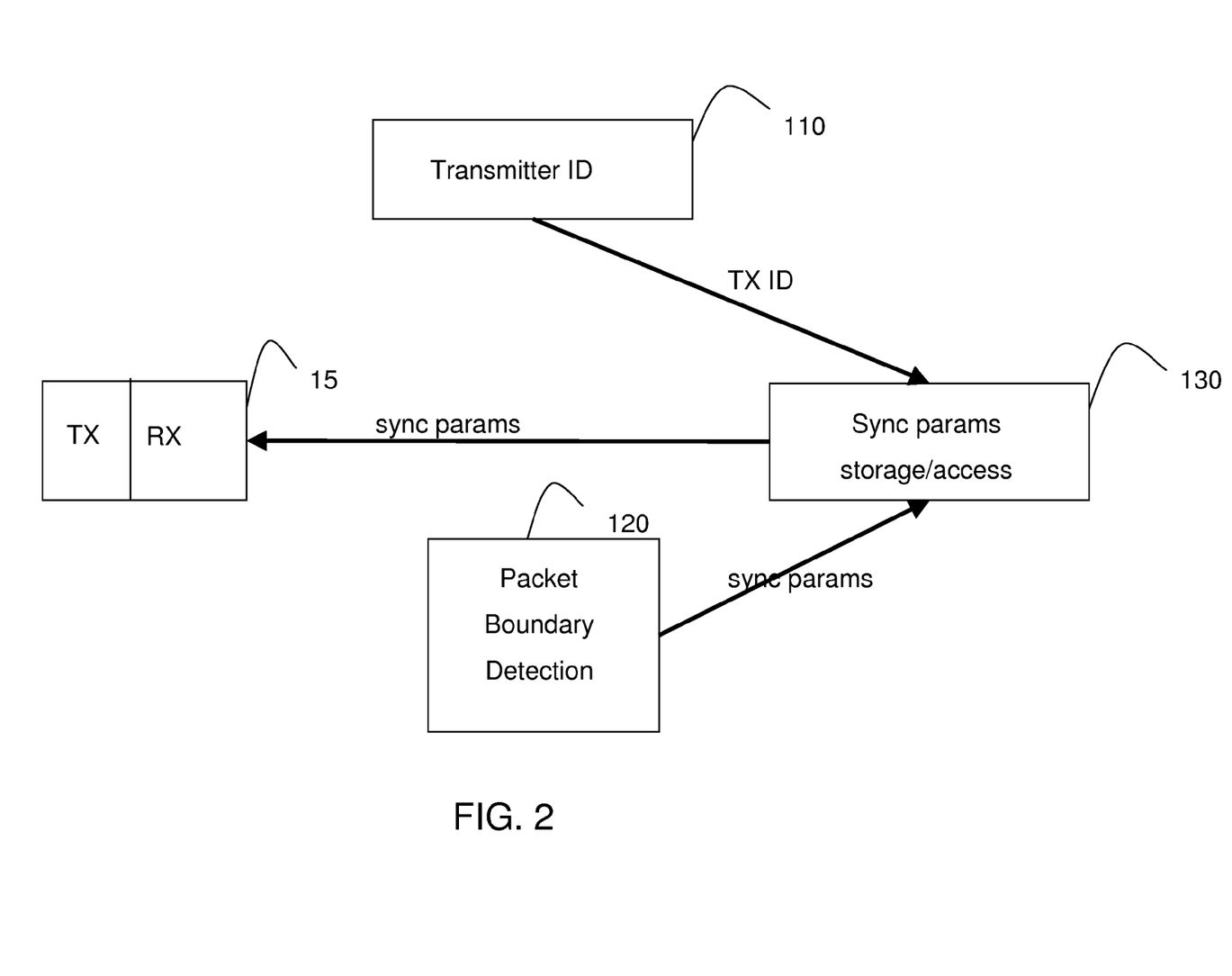
FIG. 2 illustrates the communication among various blocks of a synchronization system according to an embodiment of the invention, with respect to a receiving terminal within a packet switched network.

FIG. 2 illustrates the operation of the synchronization system 100, with respect to a given receiving terminal 15, according to one aspect of the invention. The identity of the originating transmitter TX ID for an incoming packet of information is communicated by the transmitter identification system 110 to the storage-access system 130. If synchronization parameters corresponding to the received TX ID are not available within the storage-access system 130, the packet boundary detection system 120 obtains (i.e. detects and calculates/estimates) synchronization parameters with respect to the corresponding transmitter and sends them for storage to the storage-access system 130. If synchronization parameters corresponding to the received TX ID are already available within the storage-access system 130, these synchronization parameters are communicated to the receiver, which is adjusted based on them to allow decoding of incoming packet.

Figure 3A:
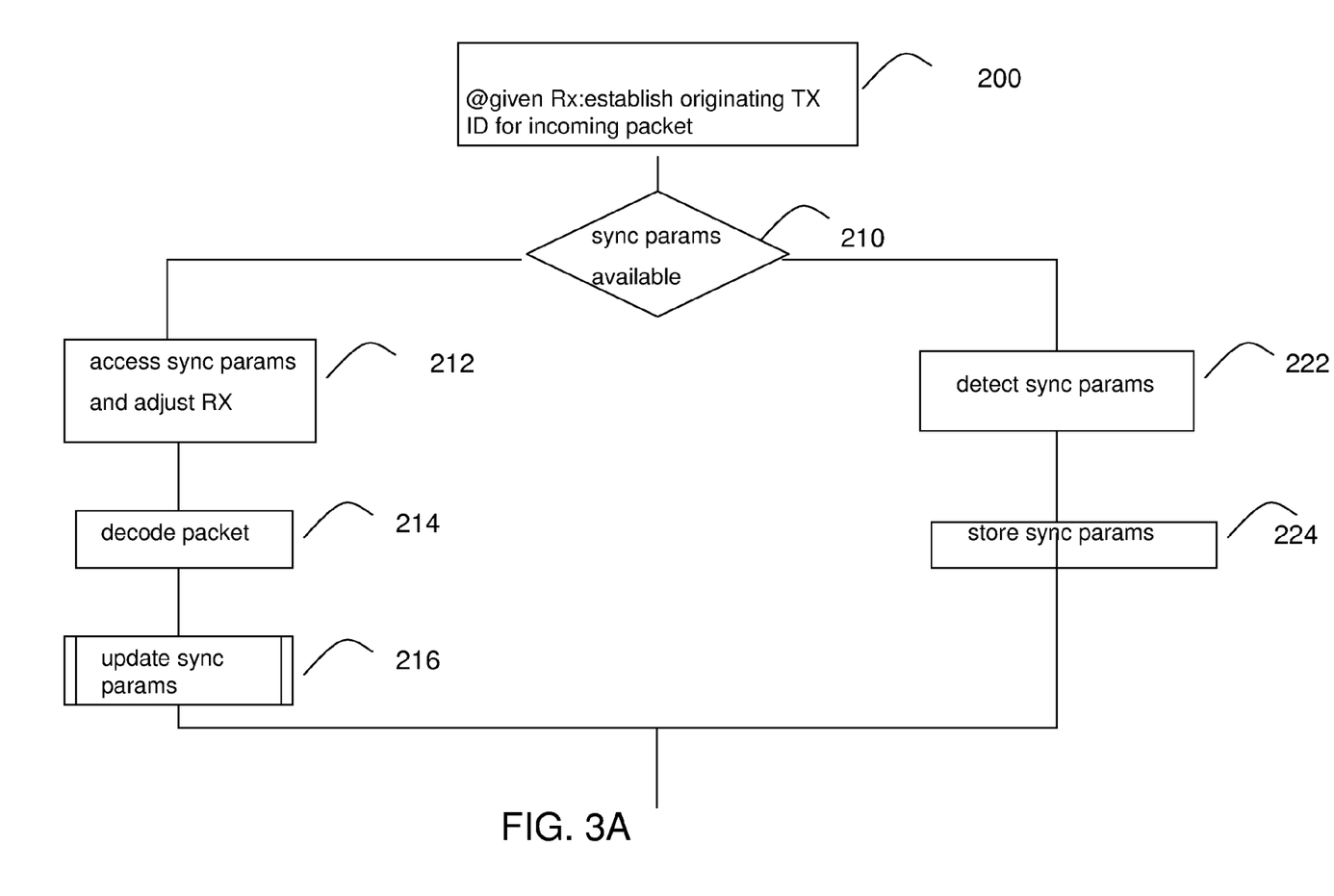
FIGS. 3A and 3B are flow charts of a method of packet synchronization according to two alternate embodiments of the invention.

FIG. 3A is a flow chart for a method of packet synchronization within a packet switched network at a receiver terminal within the network, according to a first embodiment of the invention. The method comprises the initial step of detecting the identity of the originating transmitter TX ID for the incoming packet of information 200. This step occurs prior to receiving the incoming packet, preferably allowing sufficient time to allow retrieval of synchronization parameters, if available, and adjustment of receiver based on these parameters, for accurate reading of the incoming packet. If synchronization parameters are available for the detected TX ID, step 210, then the receiver accesses synchronization parameters, step 212, and used in adjusting the receiver for decoding the incoming packet, step 214. Optionally, information from the incoming packet can be used to update existing synchronization parameters, step 216. If synchronization parameters are not available for the detected TX ID, step 210, they are detected, step 222, and stored, step 224.

Figure 3B:
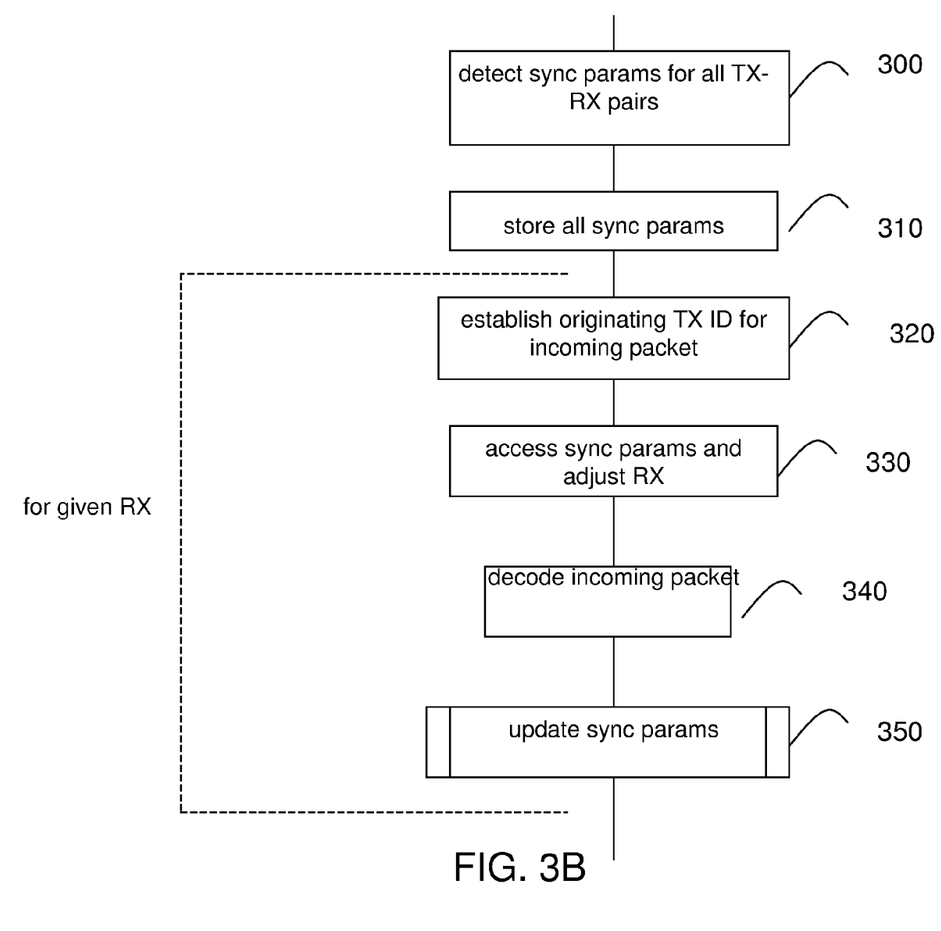

An alternate embodiment for a method of packet synchronization within a packet switched network at a receiver terminal within the network is illustrated in FIG. 3B. In this case, synchronization parameters for all transmitter-receiver (TX-Rx) pairs within the networks are detected and determined (i.e. calculated/estimated), step 300, and then stored, step 310. Next, at a given receiver, the identity of the originating transmitter, TX ID, for the incoming packet of information is established, step 320. Same considerations with respect to timing apply as in the case of the embodiment in FIG. 3A. Next, the given receiver accesses the corresponding synchronization parameters, step 330, and uses them for decoding the packet, step 340. Optionally, information from the incoming packet can be used to update existing synchronization parameters, step 350.

In some cases, separating synchronization parameters into global synchronization parameters and local synchronization parameters may present advantages in terms of system robustness and complexity. The local synchronization parameters are defined as parameters that are adjusted locally, at a given receiver. Global synchronization parameters are the complementary set, i.e. are parameters that are adjusted at a remote location from a given receiver, such as at the transmitter. As an example, the timing offset T for a given transmitter-receiver pair on the network with respect to the internal reference timing systems of the transmitter and receiver can be a synchronization parameter that may be split into a global timing delay $T_{global}$ and a local delay $T_{local}$, with $T \approx T_{global} + T_{local}$. Once T is measured, packets can be transmitted between the transmitter-receiver pair by adjusting for $T_{global}$ at the transmitter, i.e. advancing transmission of the packet by $T_{global}$, and adjusting for $T_{local}$ at the receiver. Advantageously, for a larger network, all transmitters may transmit packets by taking into account the average time delay on the network, therefore increasing the overall alignment of the system.

Figure 4A:
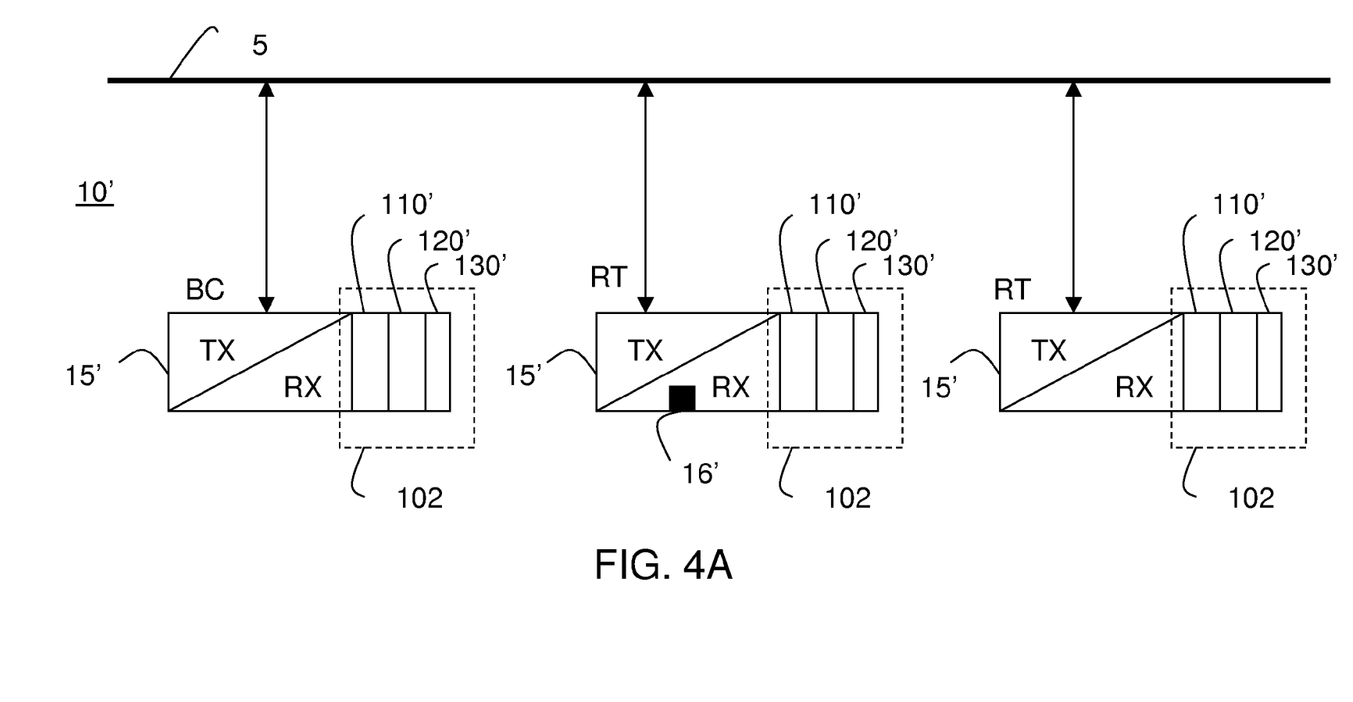
FIG. 4A is a block diagram of a packet switched network comprising a synchronization system according to the preferred embodiment of the invention.

Referring now to FIG. 4A, a synchronization system according to the preferred embodiment of the invention is used within a packet switched network 10' in which Orthogonal Frequency Division Multiplexing (OFDM) encoded packets are communicated over a MIL-STD-1553 data bus 5. The synchronization system comprises transmitter identification modules 110', packet boundary modules 120' and storage-access modules 130'. Each terminal within the network has functionally and physically associated its own triplet of modules 110', 120', 130'.

Figure 4B:
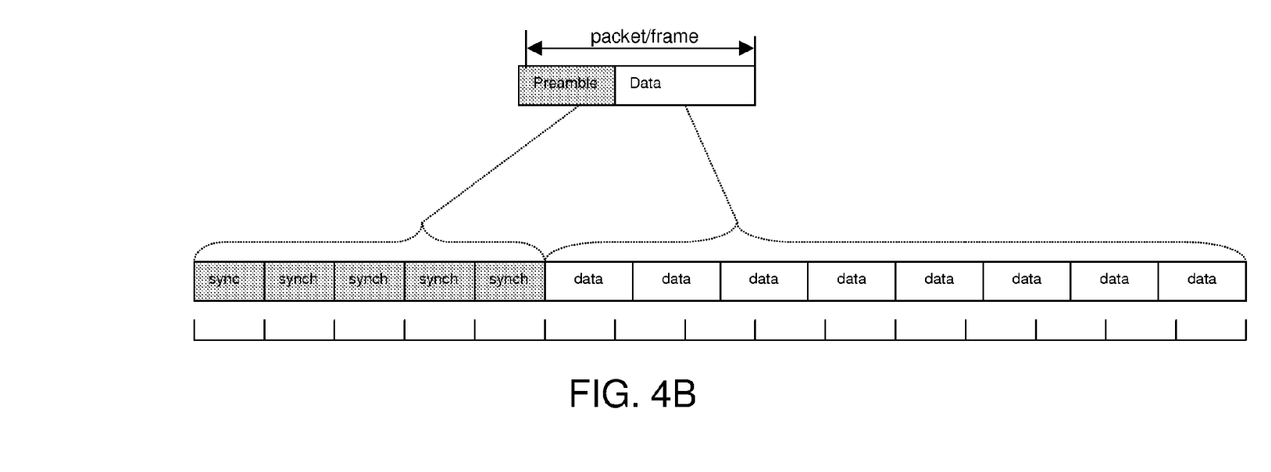
FIG. 4B illustrates a packet of information as used in conjunction with the preferred embodiments of the invention.

FIG. 4B illustrates a packet of information as used in the preferred embodiments of the invention, the packet comprising a preamble part, made of synchronization symbols and a data part, made of data symbols.

Figure 4C:
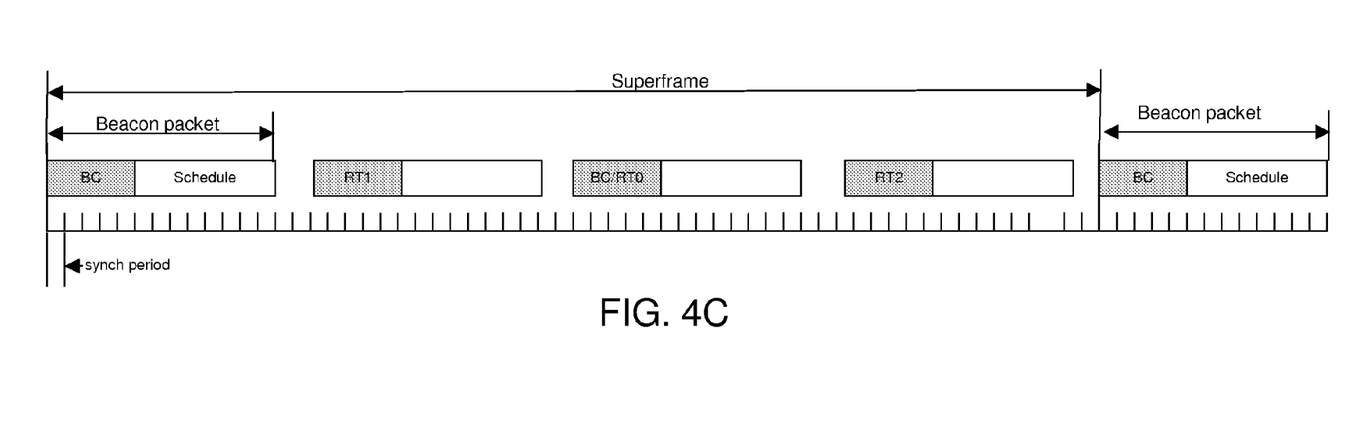
FIG. 4C illustrates a Superframe as used as used in conjunction with the preferred embodiments of the invention.

One of the terminals 15' is designated as Bus Controller (BC) terminal and periodically transmits a bus control message on the bus, known as a beacon packet or beacon frame. The remaining terminals 15' are known as Remote Terminals (RT's). The bus control message undergoes distortion and propagation delays on the bus. Referring also to FIG. 4C, a Superframe comprises all packets seen by a terminal between the start of a beacon packets and the start of the following beacon packet. Thus, a Superframe starts with a BC beacon packet including a transmission schedule for all RT's and further comprises RT packets received from individual RTs. The BC and RT designations are in the logical sense rather than in a hardware manner, meaning that any terminal 15' can be promoted BC. Also, any designated BC can also act as an RT, scheduling RT-like transmissions for itself within a Superframe. In FIG. 4C, the BC schedules itself to transmit as RT0, following transmission of RT1 and prior to transmission of RT2. As the length of the individual packets and preambles can be variable (and programmable), the length of the Superframe can also vary and may start at any multiple of a sync symbol period.

In operation, synchronization or alignment of OFDM packets or frames is advantageously carried out as a two-step process. First step, S1, allows for preamble or sync symbol alignment at a given receiver relative to a given transmitter based on the first k packets sent by the transmitter to the receiver, where k is an integer of a preset value. Second step, S2, allows for frame alignment for all subsequent packets sent by the transmitter to the receiver.

Specifically, within the first alignment step S1, the receiver terminal within a given transmitter-receiver pair of terminals acquires timing information about sync symbol boundaries of packets incoming from the transmitter of the pair, relative to the receiver's reference timing system 16', via its associated packet boundary detection module 120'. At the completion of the first alignment step S1, the receiver would know, relative to its reference timing system, the time when sync symbols of packets from the transmitter of the given pair may begin and end. This timing information is a synchronization parameter herein referred to as a sync symbol boundaries parameter. Once acquired, the sync symbol boundaries parameter is stored within the storage-access module 130' of the given receiver. For every transmitter-receiver pair, the first alignment step S1 requires at least one frame being analyzed by the receiver's packet boundary module 120', but k frames may be used, where k is an integer of a preset value. According to this embodiment, data within frames used for the first alignment step S1 needs not be decoded.

For example and without limitation, within each RT, the first alignment step S1 occurs the first time the BC transmits a packet to the RT. Because there has been no previous transmission, the synch symbols of the BC frame arrive at the given RT's interface to the bus at an unknown time with respect to the given RT's internal reference timing system 16'. The RT determines the presence of the BC packet using its associated packet boundary module 120', by detecting the presence of synch symbols on the bus.

In the case of OFDM packets, a frame of information consists of a preamble containing synchronization symbols followed by a number of data symbols. In the preferred embodiment, the preamble contains 5 synch symbols and the data comes in multiples of 8 data symbols, the 8 data symbols corresponding to the length of a FEC coding block, in this case. Preferably, the sync symbols are periodic and phase continuous at the symbol boundaries. Furthermore, in the preferred embodiment, synch symbols are linear frequency modulated (LFM). In particular, synchronization symbols are generated based on a method or using a bandwidth configurable modem as described in co-pending U.S. patent application Ser. No. 11/332,395 "Approximate Linear FM Synchronization Symbols for a Bandwidth Configurable OFDM Modem" incorporated here by reference. The sync symbols and the data symbols may not be the same size and there may be null intervals between frames. Preferably, the sync symbols are large with respect to the worst case timing delay between any two terminals 15' within the network. Advantageously, the sync symbols may be programmable in length, for accommodating various changes in network topology from a timing point of view.

The packet boundary detection module 120' of the RT is used for detecting synchronization symbols, declaring packet detection and obtaining a sync symbol boundaries parameter with respect to the RT's internal reference timing system. Advantageously, the packet boundary detection module 120' is a block based receiver that does a correlation over a fixed range of samples, thereby reducing the number of computations required. The correlation may be done in the time or frequency domain. In the preferred embodiment, given the periodic nature of the synch symbols, a Fast Fourier Transform (FFT) is employed to do the block based detection processing representing a circular convolution. A threshold detector is used to indicate whether a synch symbol is present. If an Automatic Gain Control (AGC) is required for a particular application of the packet switched network, signal levels may be pre-adjusted in order not to saturate the receiver front end.

The number of detections required to trigger preamble detection may vary, but since the timing of first received BC packet is unknown, and the block based processing at the receiver may not capture all of the signal energy during one processing interval, the number of detects may vary depending on the noise conditions. The receiver may process blocks based on independent samples or may overlap samples to improve performance.

The packet boundary detection module 120' may declare sync symbol alignment when p out of N-1 sync symbols are detected via the block based receiver, where p is smaller than or equal to N-1, and N is the number of sync symbols within preamble. Requiring N-1 synch detections to trigger preamble detection enhances the probability of detection and reduces the false detect rate. In the preferred embodiment, since the preamble of a BC frame contains 5 sync symbols, detecting 4 consecutive sync symbols triggers preamble detection.

The sync symbol boundaries parameter takes into account analog and digital processing delays encountered by a packet originated by the BC and traveling to the given RT. Once obtained, the sync symbol boundaries parameter is stored in the storage-access module 130' associated with the given RT.

The second alignment step S2 of the packet synchronization process occurs for all packets sent by the BC subsequent to the packet(s) used in obtaining the sync symbol boundaries parameter. Within this second step, a receiving RT retrieves the sync symbol boundaries parameter from its storage-access module 130' and adjusts its receiver's timing such that the receiver is pre-aligned to the incoming waveform. Once the RT has aligned its receiver to the expected symbol timing, N successive successful synch detections are required to declare frame alignment for an OFDM packet with N sync symbols, such as 5 for the preferred embodiment. Advantageously, this increases accuracy of frame detection, as the block processing at the receivers will capture all the signal energy for each synch. There will be negligible synch symbol energy at all other times, thus reducing the false detect rate. Since the optimum AGC level had been already established for detecting the BC frame in step S1, this can be maintained and updated for detecting and decoding the subsequent frame. BC frame subsequent to the frame(s) used in the first alignment step S1 are transmitted and understood by all other RT's to be sync symbol aligned, i.e. there is no indeterminism regarding synch boundaries, for some reasonable duration.

In the preferred embodiment, while the network topology does not changed significantly from a timing point of view, once a given RT is aligned to the BC, it is approximately aligned to all other RT's and the two-step synchronization process is not required for this given RT to align to every other RT. More generally, once existent terminals within the networks are approximately aligned to each other, every terminal that starts-up or recovers from an error condition must only align itself to at least one other terminal, in order to be aligned with the rest of the terminals. Specifically, in the event an RT starts-up or recovers from an error condition such as due to noise factors, and as such, cannot decode messages and does not understand frame alignment or schedules, but the network topology has not changed significantly from a timing point a view, the RT can adjust itself by attempting to detect N synchs in a row to declare frame alignment, i.e. by undergoing only step S2 of the synchronization process. Therefore, decoding the next packet can be carried out with a single synchronization step rather than with the two-step synchronization process.

In general, the two-step synchronization process occurs whenever it is assumed the network topology has changed significantly from a timing point of view. In addition, in the preferred embodiment the two-step synchronization process occurs for the alignment of every RT with the BC.

Preferably, RT packets have the same structure as BC packets, with the exception of sync symbols, i.e. RT synch symbols are not the same as BC sync symbols. This helps distinguishing an RT synch from a BC synch, preventing improper detections during the start-up or recovery process of an RT. However, advantageously, the time duration of BC and RT sync symbols is substantially similar, and they are distinguishable by other properties. Time reversing RT sync symbols compared to BC sync symbols is an example of differentiating these sync symbols, but other methods known in the art may also be used.

Following successful frame alignment after completion of second alignment step S2, data symbols of all frames except maybe for those used in first alignment step S1, may be decoded by the receiver. In the preferred embodiment, the Bus Controller includes a schedule in the transmitted message specifying the transmission order for all terminals, including itself. Other information may be included in the schedule, such as destination RT, whether acknowledgement information is required, status information etc. The transmission duration for each terminal is also included in the BC control message. Alternatively, the transmission duration for an RT could be included in the RT's transmitted message. All terminals will decode BC message in order to understand the schedule.

RT's also recover their clock within some reasonable degree of accuracy from the signal transmitted by the BC. This can be done with either digital or analog circuits or a combination of the two and using software or hardware. This clock is used to control the terminals' understanding of time. In some systems such as higher order Quadrature Amplitude Modulation (QAM) based systems and systems communicating long packets, clock recovery may be a significant step to in achieving and maintaining high data throughput. Other systems, such as Differential Quadrature Phase Shift Keying (DQPSK) based systems communicating short packets, may not have their data throughput depending so much on the clock recovery process.

An additional delay, such as the average time delay on the bus, may be added to when the signal is transmitted as long as all the other terminals are aware of it. This would increase overall alignment of the system, making the system more robust in situations such as local failures of RT's.

If it is the first time a given RT transmits, all other terminals, being aware of which terminal is transmitting next based on the received BC schedule, will measure the signal timing of the given RT transmitted signal with respect to their internal reference system. The signal timing of the given RT transmitted signal may include the given RT's sync symbol duration. The measured signal timing is stored within the storage-access modules 130' of all other terminals, for further use the next time the given RT transmits. It is assumed for the preferred embodiment that the difference in the RT sync symbol timing relative to the BC sync symbol timing is small compared to the sync symbols duration, therefore the acquisition by one RT of another RT's transmission can occur without the two step process. Alternately, the two-step process could be carried out for each RT, following the same approach as for the BC.

Preferably, if an AGC is employed, the signal energy at the receiver can also be measured and set appropriately for decoding the RT frame. This process can also be done as a two-step process over two RT frames.

If it is not the first time an RT transmits, all other terminals, including the BC, access the associated synchronization parameters from their storage-access modules 130' and pre-adjust their receiver to appropriately align to the received signal in order to detect the maximum available synch signal energy. This enables optimal detection of the received signal. The information for all the proper alignments and gain settings are stored in a receiver for all other RT's and BC transmission that it needs to decode.

When the communication topology does not change over long time intervals, synchronization parameters such as synch symbol boundaries and gain settings can be integrated over several frames, to improve the estimate.

In the preferred embodiment, once the network is substantially aligned, i.e. all RT's are aligned to the BC and synchronization detection is no longer required, additional parameters can be used to assess and possibly improve the operation of the system. For example, once the system is aligned, functions like Cyclic Redundancy Check (CRC), Forward Error Correction (FEC) can be used in updating sync parameters algorithms, to make the system more robust to impulse noise or other such system conditions that would render updating more or less desirable at certain system states.

Figure 5A:
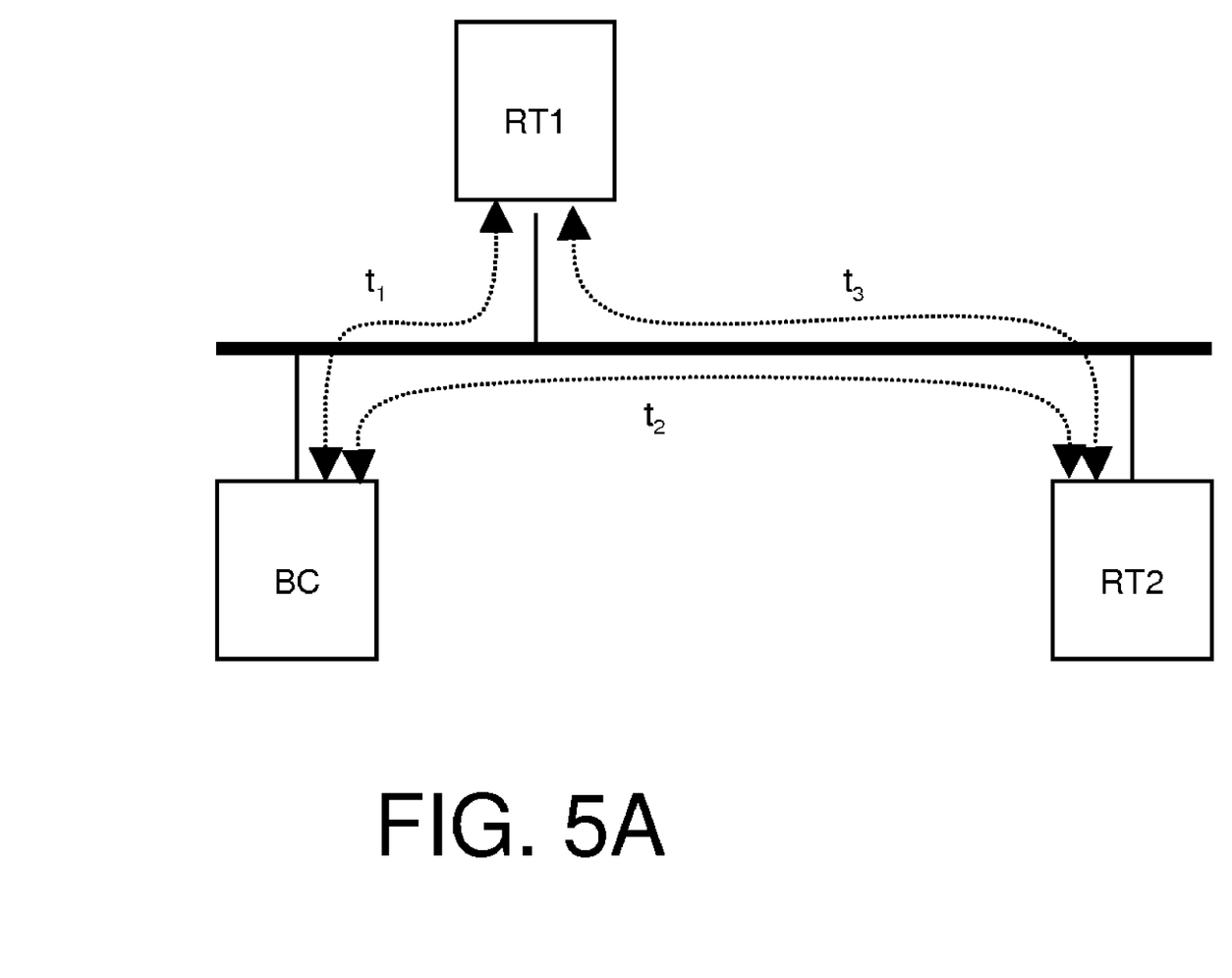
FIG. 5A illustrates a packet-switched network comprising a Bus Controller and two Remote Terminals, RT1 and RT2, according to the preferred embodiment of the invention; illustrating propagation delays between terminals.
Figure 5B:
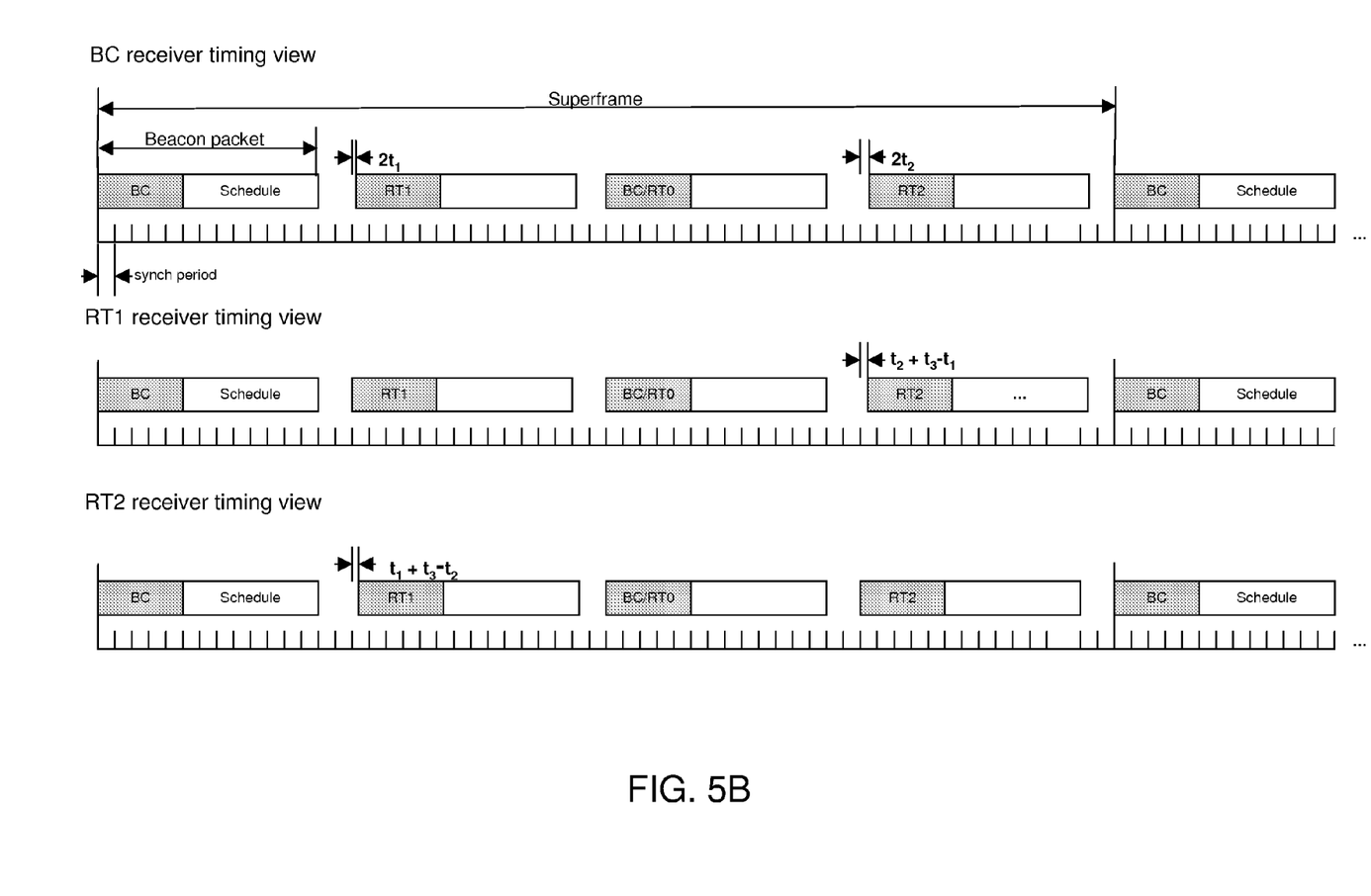
FIG. 5B illustrates the timing view at the receivers of BC, RT1 and RT2 associated with the network in FIG. 5A.

FIG. 5A illustrates a networks comprising a BC, RT1 and RT2, according to the preferred embodiment of the invention. The propagation delays between the terminals are $t_1$, between BC and RT1, $t_2$, between BC and RT2 and $t_3$, between RT1 and RT2, respectively. FIG. 5B illustrates the timing view at the receivers of BC, RT1 and RT2 associated with the network in FIG. 5A, after synchronization to the BC and to the specific terminal has occurred. The BC is always aligned to its own transmission since it is the timing reference for the network. An RT is also always aligned to the BC and to its own transmission which has been synchronized to the BC at the RT interface. The timing delays illustrated represent what the respective terminal would still need to account for in order to be symbol aligned to the packets transmitted by terminals within the network other than the BC or itself.

Bus Redundancy 1553 is generally utilized for hard real time communications, where a message is expected to be communicated over the bus in a deterministic way with known latency and very low probability that the message is not decoded successfully. For such critical communications, MIL-STD-1553 specifies a primary data bus and a at least one redundant (default) bus, providing communications path redundancy ("dual bus redundancy"). For dual redundant bus applications, 1553 requires that a 1553 receiver (not shown) be capable of listening to and decoding commands on the primary and the redundant bus at the same time. A 1553 terminal (not shown) transmits 1553 signals on only one bus at a time. Redundancy can be extended to more than 2 buses. Co-assigned U.S. patent application Ser. No. 11/419,742, incorporated here by reference, describes a dual redundant system and method in the case of a 1553 communication system comprising a non-1553 communication overlay network. For such a system, but also in general for packet-switched networks with a bus redundancy feature, synchronization parameters as describe above can be detected, determined, stored and access on a per bus basis. For the preferred embodiment featuring an OFDM overlay network on a 1553 dual-redundant bus, synchronization parameters take into account the transmission of OFDM packets by each terminal on the primary and redundant buses and the reception of packets on either bus, depending on predefined bus selection criteria. Accordingly, bus specific synchronization parameters may be detected, estimated, stored, accessed and used for synchronization.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. Within a packet switched communication network comprising a plurality of terminals for sending and receiving packets of information, a synchronization system comprising:
   a transmitter-identification system for communicating to each receiving terminal within the network the identity of the originating transmitter terminal for a given packet of information, said communication of the transmitter identity occurring prior to the reception of the given packet of information;
   a packet-boundary detection system for enabling detection of packet synchronization parameters for all transmitter-receiver pairs of terminals within the network; and
   a storage-access system for storage of detected packet synchronization parameters and for allowing access by the receiver within the corresponding transmitter-receiver pair to access said packet synchronization parameters.

2. The synchronization system as in claim 1, wherein said packets of information are based on Orthogonal Frequency Division Multiplexing (OFDM) modulation technique.

3. The synchronization system as in claim 1, wherein the transmitter identification system comprises a Bus Controller periodically transmitting a bus control message on the bus.

4. The synchronization system as in claim 1, wherein the transmitter identification system comprises a transmission scheduler for sharing a transmission schedule among all terminals.

5. The synchronization system as in claim 1, wherein the transmitter identification system comprises a priority signaler for enabling each terminal to assert priority during a priority signaling interval and for enabling each terminal to acknowledge priority signaling intervals for other terminals.

6. The synchronization system as in claim 1, wherein the packet boundary detection system comprises a synch symbol alignment subsystem, for detecting synch symbol boundaries with respect to a given receiver's reference timing system.

7. The synchronization system as in claim 1, wherein the packet boundary detection system comprises a module for performing synch symbol alignment at a receiver based on a single packet.

8. The synchronization system as in claim 1, wherein the packet switched network comprises a Bus Control (BC) terminal sending a bus control message to a plurality of Remote Terminals (RT's).

9. The synchronization system as in claim 8, and wherein BC packets and RT packets are different only with respect to sync symbols within the packet preamble.

10. The synchronization system as in claim 1, wherein the packet boundary detection system comprises a correlation receiver.

11. The synchronization system as in claim 1, wherein the packet boundary detection system comprises a block based receiver for performing correlation over predetermined number of samples.

12. The synchronization system as in claim 11, wherein the packet boundary detection declares sync symbol alignment when p out of N-1 sync symbols are detected via the block based receiver, where p smaller than or equal to N-1, and N is the number of sync symbols within preamble.

13. The synchronization system as in claim 1, wherein each packet has a preamble having a plurality of periodic synch symbols.

14. The synchronization system as in claim 1, wherein each packet has a preamble having a plurality of phase continuous synch symbols.

15. The synchronization system as in claim 1, wherein synchronization parameters include relative timing offsets of packet boundaries with respect to internal reference timing systems of receiving terminals.

16. The synchronization system as in claim 1, wherein synchronization parameters are updated.

17. The synchronization system as in claim 15, wherein synchronization parameters are integrated over time.

18. The synchronization system as in claim 1, wherein synchronization parameters include global synchronization parameters and local synchronization parameters.

19. The synchronization system as in claim 18, wherein global synchronization parameters include the average time delay on the network.

20. The synchronization system as in claim 1, wherein synchronization parameters take into account bus dual-redundancy within the network.

21. A method of packet synchronization at a given receiver terminal within a packet-switched communication network comprising a plurality of terminals, the method comprising the steps of:
   establishing the identity of the originating transmitter for an incoming packet of information;
   if synchronization parameters corresponding to the identified transmitter are available, accessing said synchronization parameters, adjusting receiver based on synchronization parameters and decoding incoming packet of information;
   if synchronization parameters corresponding to the identified transmitter are not available, detecting packet synchronization parameters associated with identified transmitter and storing the detected synchronization parameters.

22. A method of packet synchronization within a packet-switched communication network comprising a plurality of terminals, the method comprising the steps of:
   detecting synchronization parameters associated with all transmitter-receiver terminal pairs within the network and storing the detected synchronization parameters; and
   for a given receiver terminal,
   establishing the identity of the originating transmitter for an incoming packet of information;
   accessing synchronization parameters corresponding to the identified transmitter;
   adjusting receiver based on accessed synchronization parameters; and
   decoding incoming packet of information.

* * * * *

UNITED STATES PATENT AND TRADEMARK OFFICE
CERTIFICATE OF CORRECTION

PATENT NO.      : 7,664,144 B2                          Page 1 of 1
APPLICATION NO. : 11/614875
DATED           : February 16, 2010
INVENTOR(S)     : Fanson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Thirtieth Day of November, 2010

David J. Kappos
*Director of the United States Patent and Trademark Office*